United States Patent
Sahinoglu et al.

(10) Patent No.: US 7,209,438 B2
(45) Date of Patent: Apr. 24, 2007

(54) METHOD AND SYSTEM FOR ASSIGNING CIRCUITS TO A NEW SERVICE REQUEST IN A COMMUNICATIONS NETWORK

(75) Inventors: Zafer Sahinoglu, Clifton, NJ (US); Fatih M. Porikli, North Plainfield, NJ (US); Fernando M. Matsubara, Gillette, NJ (US); Johnas Cukier, Chester, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 548 days.

(21) Appl. No.: 09/862,899

(22) Filed: May 22, 2001

(65) Prior Publication Data

US 2002/0178287 A1    Nov. 28, 2002

(51) Int. Cl.
  *G08C 15/00* (2006.01)
  *H04J 3/14* (2006.01)
  *H04L 12/26* (2006.01)
(52) U.S. Cl. .................................................. 370/230
(58) Field of Classification Search ................ 370/230, 370/232–234, 395.2, 395.21; 709/226
See application file for complete search history.

(56) References Cited

U.S. PATENT DOCUMENTS

| 5,408,465 | A * | 4/1995 | Gusella et al. ............... 370/231 |
| 6,658,512 | B1 * | 12/2003 | Gokulrangan ................ 710/117 |
| 6,801,501 | B1 * | 10/2004 | Knightly et al. ............. 370/233 |
| 2002/0073225 | A1 * | 6/2002 | Dillon et al. ................ 709/233 |
| 2003/0063624 | A1 * | 4/2003 | Nagarajan et al. ........... 370/468 |
| 2004/0128384 | A1 * | 7/2004 | Rolia et al. .................. 709/226 |

* cited by examiner

*Primary Examiner*—Kevin C. Harper
(74) *Attorney, Agent, or Firm*—Dirk Brinkman; Cliffton D. Mueller; Gene V. Vinokur

(57) ABSTRACT

A system and method selects a circuit to service an application request to transmit data over a network. The network includes one or more low and high bandwidth circuits. An average utilization is measured for each circuit in a circuit analyzer should the application request be assigned to the circuit. Then, application request is assigned to the high bandwidth circuit if the average utilization is less than a predetermined threshold, assigning to the low bandwidth circuit if the average utilization is less than one, where one is a full utilization, and declined otherwise. The threshold is one minus a guard bandwidth of the high bandwidth channel.

10 Claims, 7 Drawing Sheets

601

$$\Pr\left\{\frac{s(n)+w(n)}{C_{hb}} > 1-\Delta\right\}$$

602

$$= \Pr\{s(n)+w(n) > C_{hb}\cdot(1-\Delta)\} = P\{y(n) > C_{hb}\cdot(1-\Delta)\}$$

$$= \int_{C_{hb}\cdot(1-\Delta)}^{\infty} f_y(y)dy = \int_{C_{hb}\cdot(1-\Delta)}^{\infty} \frac{1}{\sqrt{2\pi}\sqrt{\sigma_s^2+\sigma_w^2}} e^{-\frac{(y-\mu_s-\mu_w)^2}{2(\sigma_s^2+\sigma_w^2)}} dy$$

$$= Q\left(\frac{C_{hb}\cdot(1-\Delta)-\mu_s-\mu_w}{\sqrt{\sigma_s^2+\sigma_w^2}}\right)$$

603

$$\Pr\left\{\frac{s(n)}{C_{lb}} > 1\right\}$$

604

$$= \Pr\{s(n) > C_{lb}\} = Q\left\{\frac{C_{lb}-\mu_s}{\sigma_s}\right\}$$

*Fig.6*

METHOD AND SYSTEM FOR ASSIGNING CIRCUITS TO A NEW SERVICE REQUEST IN A COMMUNICATIONS NETWORK

FIELD OF THE INVENTION

The present invention relates generally to the field of network communications, and more particularly to servicing application service request to be admitted to a network.

BACKGROUND OF THE INVENTION

Networks are the principal means for communicating multimedia between communication devices. The content of the multimedia can include data, audio, text, images, video, etc. Communication devices include input/output devices, computers, terminals, multimedia workstations, fax machines, printers, servers, telephones, and personal digital assistants.

A multimedia network typically includes network switches connected to each other and to the communication devices by channels or circuits. The circuits can by physical or virtual. In the latter case, the circuit is specified by a source and destination address. The actual physical circuit used will vary over time, depending on network traffic and resource requirements and data capacity availability, usually expressed as "bandwidth."

The multimedia can be formatted in many forms, but increasingly it is formatted into packets. Packets in transit between the communication devices may temporarily be stored in buffers at the switches along the path of the circuit pending sufficient available bandwidth on subsequent circuits along the path.

Important considerations in network operation are admission control and resource allocation. Typically, admission control and resource allocation are ongoing processes that are performed periodically during transmission of bit streams. The admission control and resource allocation determinations may take into account various factors such as network topology and current available network resources, such as buffer space in the switches and the bandwidth capacity of the circuits, any quality-of-service commitments (QoS), e.g., guaranteed bandwidth, and delay or packet loss probabilities.

If the network resource requirements are over-estimated, then the network will run under capacity. Alternatively, if the network resources requirements are underestimated, then the network may become congested and packets traversing the network may be lost, see, e.g., Roberts, "*Variable-Bit-Rate Traffic-Control in B-ISDN*," IEEE Comm. Mag., pp. 50–56, September 1991; Elwalid et al, "*Effective Bandwidth of General Markovian Traffic Sources and Admission Control of High Speed Networks*," IEEE/ACM Trans. on Networking, Vol. 1, No. 3, pp. 329–343, 1993. Guerin et al., "*Equivalent Capacity and its Application to Bandwidth Allocation in High-Speed Networks*," IEEE J. Sel. Areas in Comm., Vol. 9, No. 7, pp. 968–981, September 1991.

Transmission of digital multimedia over bandwidth-limited networks will become increasingly important in future Internet and wireless applications. It is a challenging problem to cope with ever changing network parameters, such as the number of multimedia sources and receivers, the bandwidth required by each stream, and the topology of the network itself. Optimal resource allocation should dynamically consider global strategies, i.e., global network management, as well as local strategies, such as, admission control during individual connections.

Admission control and resource is generally done at the "edges" of the network in order to conserve computational resources of the network switches. While off-line systems can determine the exact bandwidth characteristics of a stream in advance, in many applications, on-line processing is desired or even required to keep delay and computational requirements low. Furthermore, any information used to make bandwidth decisions should be directly available in the compressed bit stream.

As a characteristic, prior art admission control methods either grant or deny the request for service. In the prior art, admission control is applied to an incoming request for a single transmission medium between a source and a destination.

Knightly et al. in "*D-BIND: An accurate traffic model for providing QoS guarantees to VBR traffic*," IEEE Tr. Networking, vol. 5, no. 2, pp. 219–231, 1997, describe introduces a traffic model for providing performance guarantees in integrated services networks. That model consists of a number of rate-interval pairs that are specified to the network at connection set-up time. However, for the online case, the arrival sequence is not known in advance and hence, parameter values for any traffic model are more difficult to obtain than in an off-line case. In that model, the admission criteria is a function of the deterministic delay bound, Therefore, there is a need for an improved method and system for dynamically allocating network resources at renegotiation points while transferring multimedia content over a network.

SUMMARY OF THE INVENTION

In order to obtain a statistical multiplexing gain, an admission control process must have a priori knowledge of a source's statistical properties which is difficult to obtain for live sources. The method provided in this invention does not require sources to specify how their traffic characteristics vary over time but only an application type.

A server retrieves second order statistical properties of similar application types which are already under service and estimates a temporal bandwidth usage behavior of a new request. The server determines a probability of circuit saturation upon the admission of the new connection request. In other words, the probability of exceeding a predefined utilization threshold on each transmission media. The server finalizes the admission decision and the selection of the transmission media based on the above probabilities.

More particularly, a system and method selects a circuit to service an application request to transmit data over a network. The network includes one or more low and high bandwidth circuits.

An average utilization is measured for each circuit in a circuit analyzer should the application request be assigned to the circuit. Then, an admission control unit assigns the application request to the high bandwidth circuit if the average utilization is less than a predetermined threshold, to the low bandwidth circuit if the average utilization is less than one, where one is a full utilization, and declines otherwise. The threshold is one minus a guard bandwidth of the high bandwidth channel. The assigning is done with a switch for connecting the circuits to the applications making the requests.

BRIEF DESCRIPTION OF THE DRAWINGS

FIG. 6 is a block diagram of FIG. 5 to a greater level of detail; and

DETAILED DESCRIPTION OF THE PREFERRED EMBODIMENT

Figure 1:
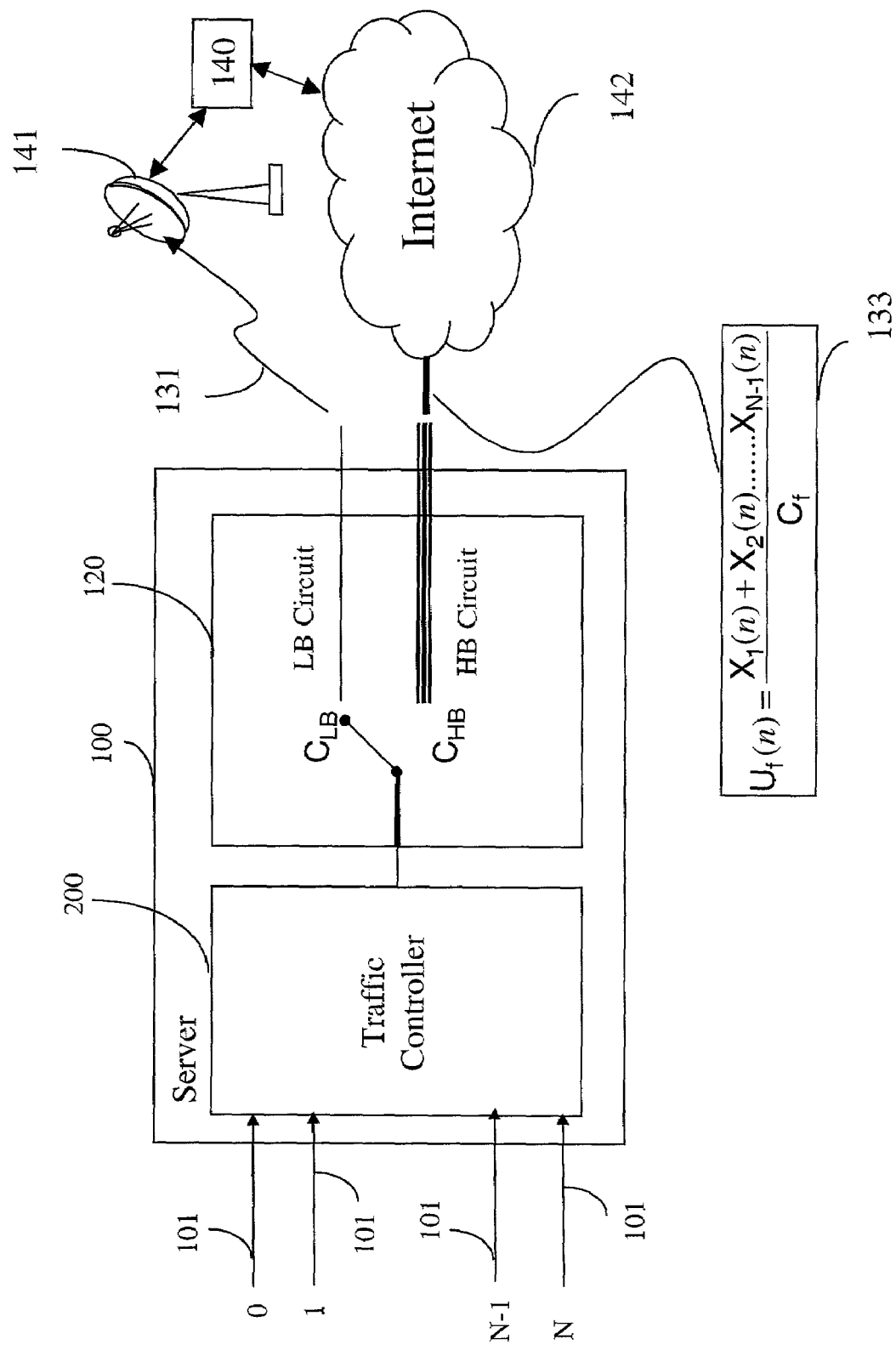
FIG. 1 is a block diagram of a system that assigns circuits according to the invention.

This description and the drawings make reference to the following terms in describing network and circuit characteristics:

$C_{LB}$, Capacity of low bandwidth circuit $C_{HB}$, Capacity of low bandwidth circuit $U_h(n)$ Utilization of high bandwidth circuit at a time instant $\mu_w$ Mean of data rate of background traffic at time of service request $\sigma_{w+}$ Standard deviation of data rate of background traffic $\Delta$ Guard bandwidth to prevent saturation of high bandwidth circuit N Number of current application requests being serviced M Number of taps on delay line D Bandwidth of request s(n) Arrival rate of data $\mu_s$ Mean of data arrival rate of traffic at time of service request $\sigma_s$ Standard deviation of data arrival rate of background traffic System Overview As shown in FIG. 1, the present invention provides a method and system for admission control and routing of multimedia content ("traffic") in response to service requests (0, . . ., N) 101 made by applications. As shown in FIG. 1, the system includes a network server 100 with a traffic controller 200, and a circuit switch 120. The system is connected to a network 140 including a wireless network 141, and the Internet 142. The switch 120 can connect any of the requests 101 to any number of different circuits 131–132 of a network 140.

As a characteristic, the various circuits of the network 140 have different bandwidth capacities. For example, the circuit 131 connects to the network via a low bandwidth capacity ($C_{LB}$) base station of the wireless network 141, and the circuit 132 to the network via a high bandwidth capacity ($C_{HB}$) circuit of the Internet 142. In the method according to the invention, the switching is based on properties of the applications and circuit conditions. As shown in FIG. 1, the utilization 133 of the high bandwidth circuit at an instant in time for connection $X_n$ is:

$$U_L(n) = \frac{X_1(n) + X_2(n) \ldots X_{N-1}(n)}{C_{LB}}$$

Circuit Assignment with known Application Properties

Figure 2:
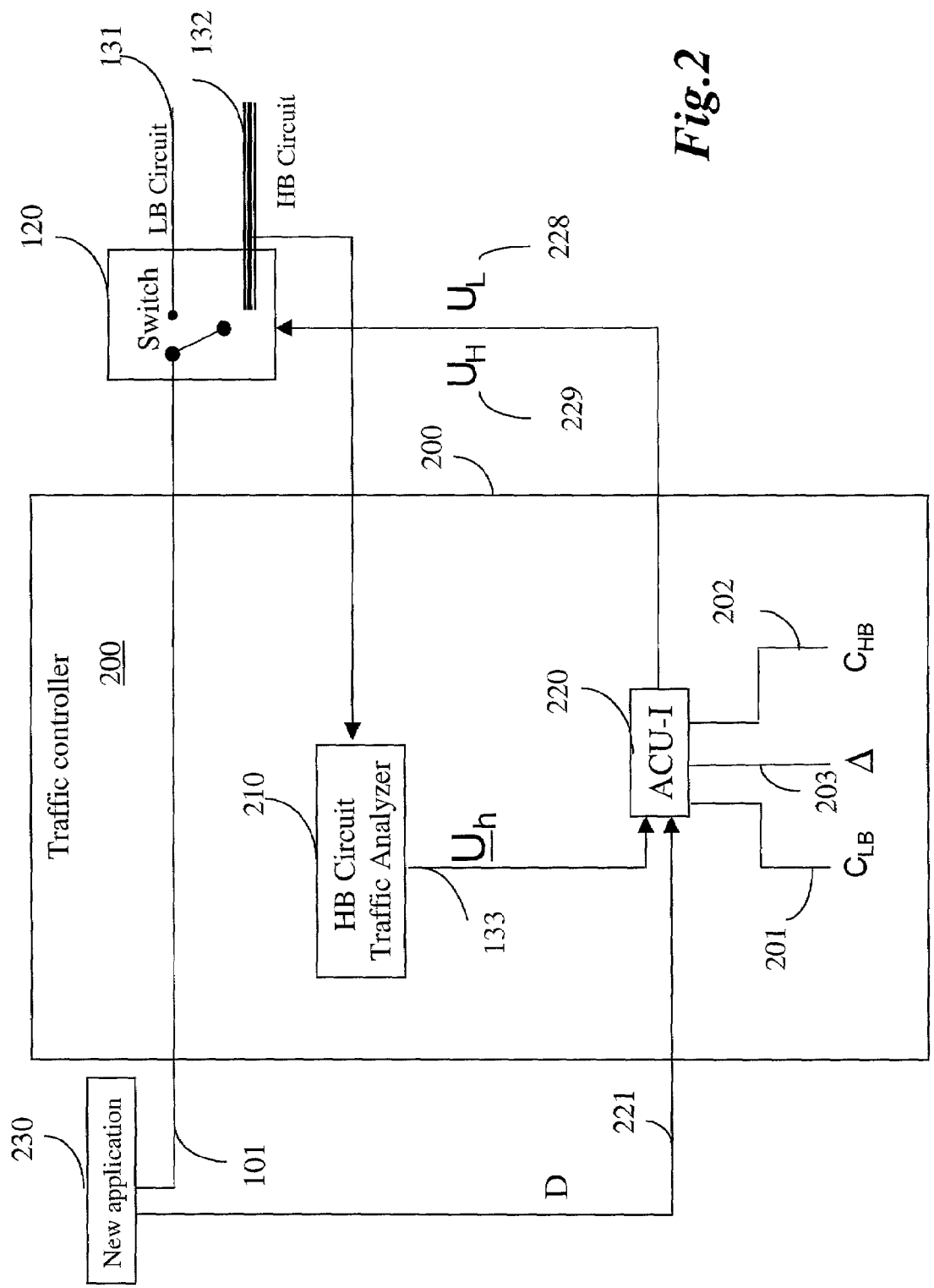
FIG. 2 is a block diagram of a first traffic controller assigning circuits according to the invention using known application properties.

FIG. 2 shows one embodiment of the invention where the traffic controller 200 makes circuit assignments knowing properties of an application 230 making the service request 101. The traffic controller 200 includes a high bandwidth circuit traffic analyzer 210, and a first admission control unit (ACU-I) 220. The analyzer 210 measures an average utilization $U_h$ 133 of the high bandwidth circuit within the last M time slots, where M is an integer. The ACU-I 220 is provided with the circuit capacities $C_{lb}$ 201 and $C_{hb}$ 202, and a guard bandwidth Δ203 provided via the switch 120. The guard bandwidth is to prevent circuit saturation. In other words, the guard bandwidth is an excess bandwidth available at any instant in time when the data rate is bursty. The ACU-I 220 is also provided with the request D 221 from the application 230.

Figure 3:
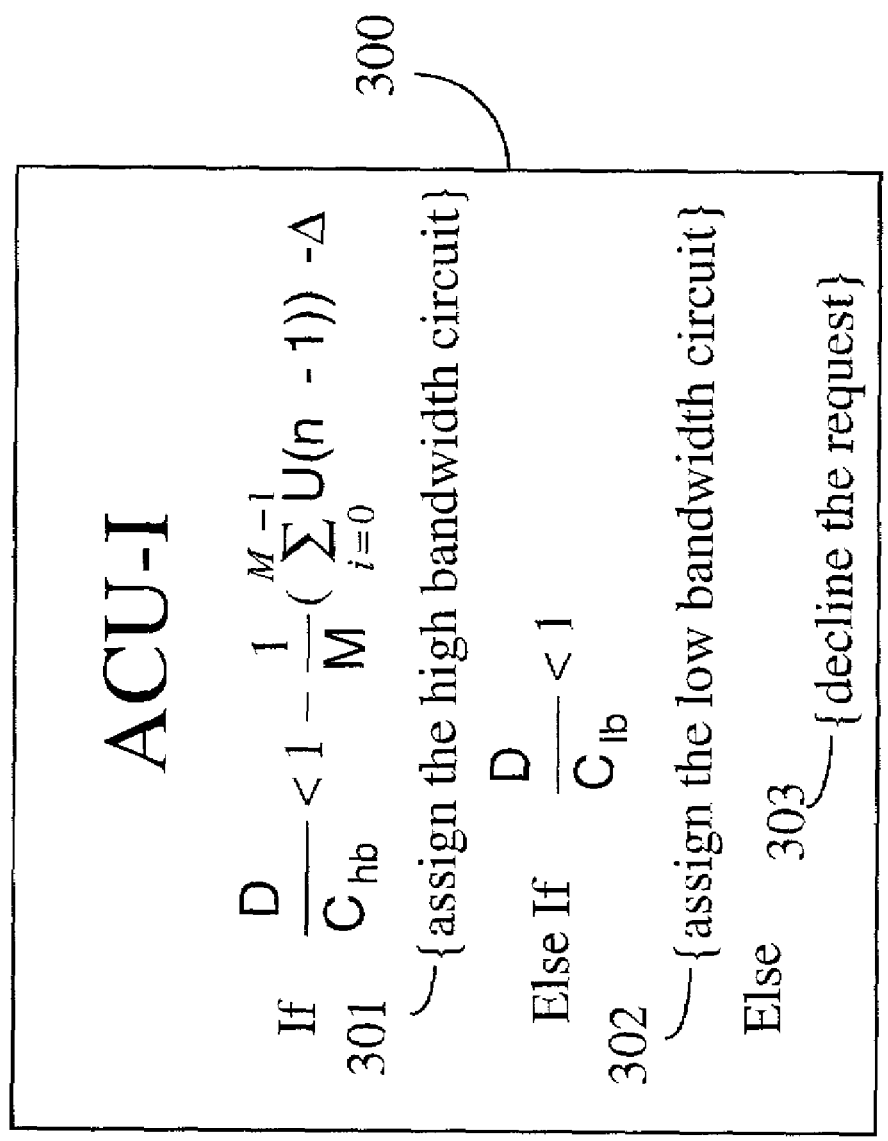
FIG. 3 is a block diagram of a method used by a controller of FIG. 2.

As also shown in FIG. 3, the ACU-I 220 determines 300 a utilization $U_L$ 228 and $U_H$ 229 for each circuit 131–132 that would be due to the admission of the request 221, based on the network parameters 201–203, and 133.

If the entire capacity of any circuit is used, the resulting utilization on that circuit is 1. In other words, the utilization on a circuit varies between 0 and 1, zero meaning no utilization and 1 meaning full utilization. The priority in the admission decision is given to the high bandwidth circuit 132 because of its greater capacity. Therefore, the availability of the high bandwidth circuit 132 is checked before the low bandwidth circuit 131.

If the utilization $U_H$ 228 on the high bandwidth circuit 132 would be less than a threshold defined by (1-Δ203) with the admission of the request 101, the request 101 is granted 301, and the requested application service is connected to the high bandwidth circuit 132 by the switch 120. Otherwise, the utilization $U_L$ 229 for the low bandwidth circuit 131 is determined. If the utilization on the low bandwidth circuit that would be due to the request 221 is less than one, then the requested application service is assigned 302 to the low bandwidth circuit 131 by the switch 120. If neither case can be met, then the application request is declined 303.

Circuit Assignment with Probabilistic Application Properties

Figure 4:
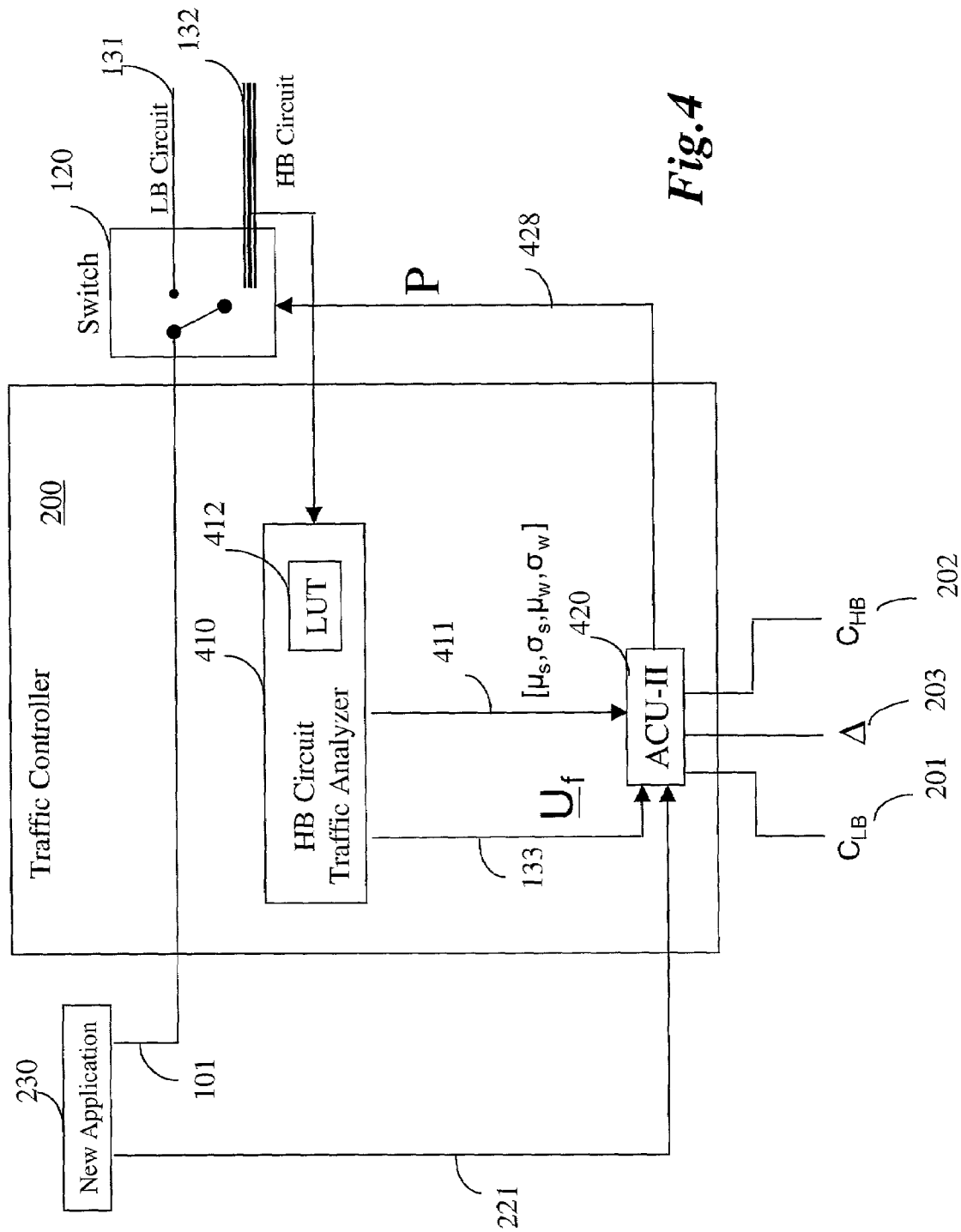
FIG. 4 is a block diagram of a second traffic controller assigning circuits according to the invention using known application properties.

FIG. 4 shows another embodiment of the invention where the traffic controller 200 makes circuit assignments without knowing the properties of an application 230 making the service request 221. The traffic controller 200 includes a high bandwidth circuit traffic analyzer 410, and a second admission control unit (ACU-II) 420. The analyzer 410 determines the average utilization $U_h$ 133 of the high bandwidth circuit within the last M time slots, where M is an integer, as before. The ACU-II 420 is provided with the circuit capacities $C_{lb}$ 201 and $C_{hb}$ 202, the guard bandwidth Δ203 via the switch 120. The guard bandwidth prevents circuit saturation or over-utilization. The ACU-II 420 is also provided with the request D 221.

The analyzer 410 also provides 411 the ACU-II 420 with the mean data arrival rate $\mu_s$ and the standard deviation $\sigma_s$ of the data arrival rate of traffic with the identical application type as that of the request 221, and with the mean data rate $\mu_w$ and the standard deviation $\sigma_w$ of the aggregate traffic on the high bandwidth circuit 132. This information is stored in a look-up table (LUT) 412 of the analyzer 410 and is updated based on the bit arrival amounts in every predetermined time slot These statistical parameters, $\mu_w$, $\sigma_w$, $\mu_s$, $\sigma_s$, are considered to be, but not necessarily, according to a Gaussian distribution for ease of analysis. In computation of the parameters 411, the bit arrival amounts in the last M consecutive time slots are used.

Figure 5:
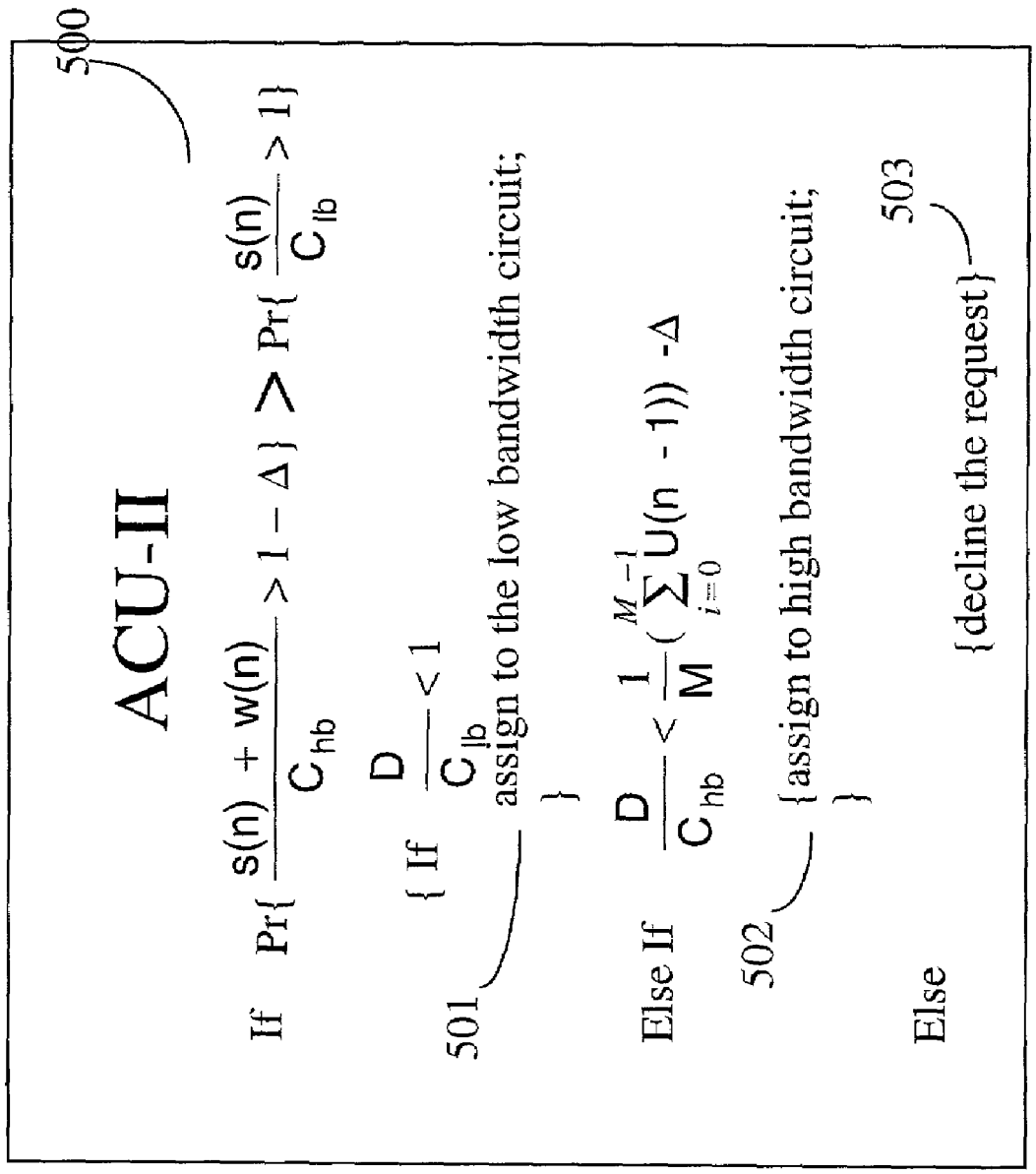
FIG. 5 is a block diagram of a method used by a controller of FIG. 4.

As shown in FIG. 5, the ACU-II 420 determines 500 a probability Pr of exceeding a predetermined utilization threshold for each circuit, and selects 501 the circuit with the lowest probability to service the request, provided that the selection criteria of the ACU-I 220 are also satisfied for the circuit with smallest probability so not to cause an over-utilization on the selected circuit.

For instance, if the probability of exceeding a predetermined utilization threshold on the low bandwidth circuit is smaller than that on the high bandwidth circuit, then the bandwidth demand D 221 is compared with the capacity of the low bandwidth circuit $C_{lb}$ 201. In case D 221 is less than $C_{lb}$ 201, the low bandwidth circuit 501 is selected to service the request. Otherwise, even though the probability of exceeding a utilization threshold on the high bandwidth circuit 132 is higher than that on the low bandwidth circuit 131, if enough bandwidth is available for the bandwidth demand D 221 on the high bandwidth circuit, then the selection is made in favor of high bandwidth circuit 502. Otherwise, the request D 221 for 101 is declined 503.

This method can also be applied to the communications networks with a single low bandwidth circuit, and multiple high bandwidth circuits between a client 230 and a server 100 in downstream direction. In this case, the smallest probability of any of the high bandwidth circuits is compared with the probability of the low bandwidth circuit, and the link selection criteria between these two circuits in ACU-II 420 is used.

FIG. 6 shows the analysis of FIG. 5 in greater detail 601 is the closed form expression for the probability of exceeding the utilization threshold (1-$\Delta$203) on the high bandwidth circuit. This closed form expression 601 can be rewritten in terms of probabilistic Q function for Gaussian distributed background traffic bit arrival process w(n) on the high bandwidth circuit and s(n), the bit arrival process of the same application as new request 230 on the high bandwidth circuit, with parameters of the mean and standard deviation $\mu_w$, $\sigma_w$, $\mu_s$, $\sigma_s$ 411, respectively 602. The determination 603 is the probability of exceeding the utilization threshold on the low bandwidth circuit together with the admission of application 230. The determination 603 uses the statistical properties of the same application type being serviced on the high bandwidth circuit as the application 230, since prior to the admission of the application 230 the actual statistical properties of 230 is not known. 604 is the probabilistic Q function equivalent of the expression 603.

Figure 7:
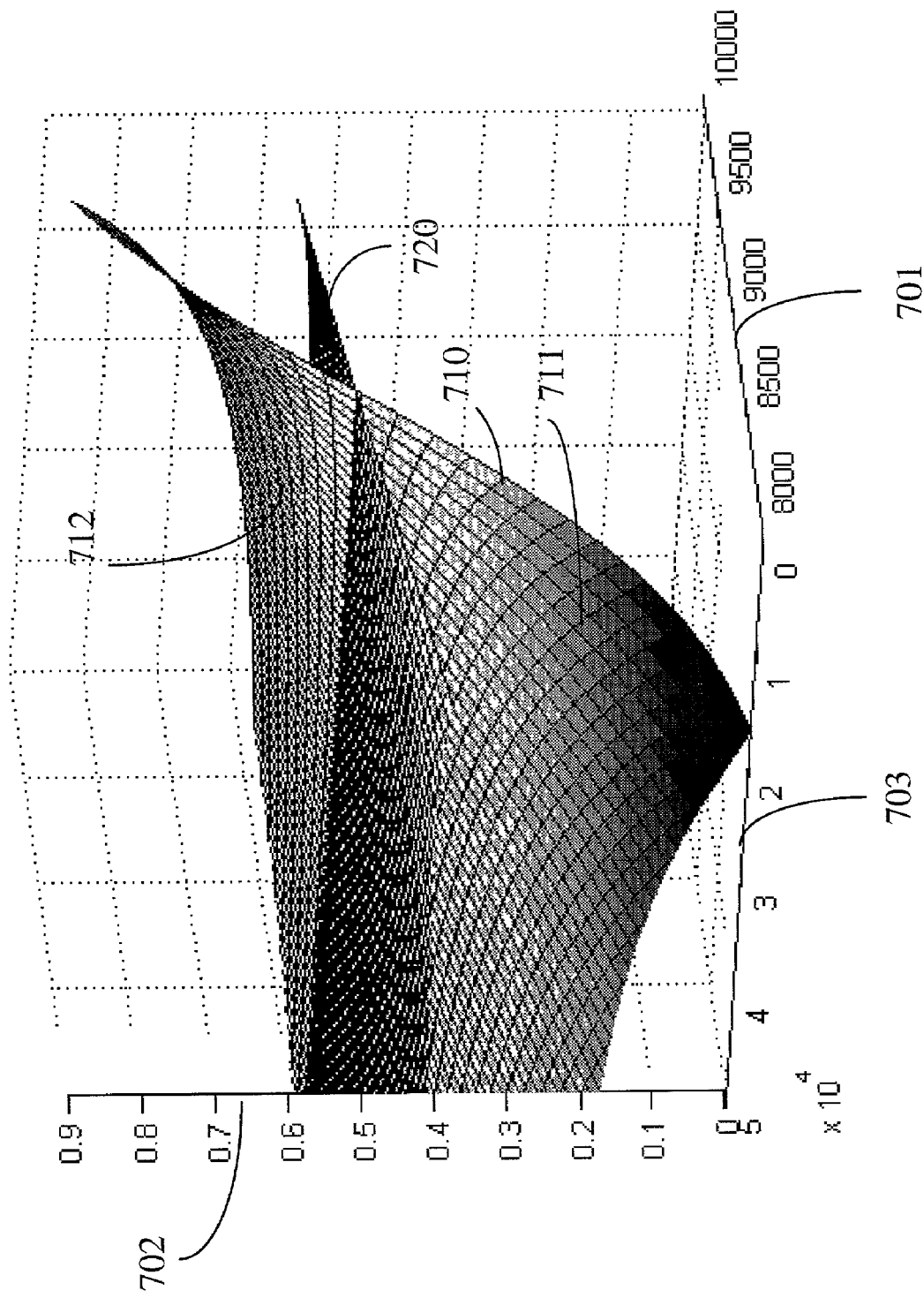
FIG. 7 is a graph showing over-utilization probabilities of data traffic.

FIG. 7 plots the probability of exceeding a predetermined utilization threshold represented by the z-axis 702 on both high 132 and low 131 bandwidth circuits at different values of $\mu_s$ represented by the x-axis 703, and $\sigma_s$ represented by the y-axis 701 for given $\Delta$203 of 0.1, $C_{lb}$ 201 of 9000 bits/sec, $C_{hb}$ 202 of 900000 bits/sec and N=88 identical applications.

In FIG. 7, a surface 710 shows the region denoting the probability of exceeding a predetermined utilization threshold (1-$\Delta$203) for the low bandwidth circuit. A surface 720 shows the region illustrating the probability of exceeding a predetermined utilization threshold for the high bandwidth circuit. These probabilities vary in time with the temporal behavior of the incoming traffic.

The surface 710 consists of two separate regions. The region 711 where the probability of exceeding a predetermined utilization threshold for the low bandwidth circuit is lower than that for the high bandwidth circuit, in which case low bandwidth circuit is selected to service the request provided that it also satisfies the constraint criterion given in ACU-I 220. The region 712 where the probability of exceeding a predetermined utilization threshold for the low bandwidth circuit is higher than that for the high bandwidth circuit, in which case the high bandwidth circuit is chosen to service the request provided that the criterion in ACU-I 220 is also fulfilled.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method of selecting a circuit to service an application request to transmit data over a network, the network having a plurality of circuits that include at least one low bandwidth circuit and one high bandwidth circuit, comprising:

estimating for each of the circuits, an average utilization if the application request is assigned to the circuit;

assigning the application request to the high bandwidth circuit if the average utilization is less than a predetermined threshold;

assigning the application request to the low bandwidth circuit if the average utilization is less than one, and otherwise declining the application request, and wherein the average utilization for each circuit exceeding a predetermined threshold is determined as a probability, and further comprising:

selecting a particular circuit having a smallest probability;

assigning the application request to the selected circuit if the selected circuit is the high bandwidth circuit and the average utilization is less than a predetermined threshold;

assigning the application request to the selected circuit if the selected circuit is the low bandwidth circuit and the average utilization is less than one, and otherwise declining the application request.

2. The method of claim 1 wherein the predetermined threshold is one minus a guard bandwidth for preventing saturation of the high bandwidth circuit.

3. The method of claim 1 wherein the network includes a plurality of high bandwidth circuits.

4. The method of claim 1 wherein the probability is based on a mean data arrival rate $\mu_s$ and a standard deviation $\sigma_s$ of the data arrival rate of traffic with an identical application type as the application request, and with a mean data rate $\mu_w$ and a standard deviation $\sigma_w$ of aggregate traffic on the high bandwidth circuit.

5. The method of claim 4 wherein the mean data arrival rate $\mu_s$ and the standard deviation $\sigma_s$ of the data arrival rate of traffic with the identical application type as the application request, and with the mean data rate $\mu_w$ and the standard deviation $\sigma_w$ of aggregate traffic on the high bandwidth circuit are stored in a table.

6. The method of claim 1 wherein the-average utilization $U_h$ of the high bandwidth circuit is within the last M time slots, where M is an integer.

7. The method of claim 1 the average utilization over predetermined number of preceding time slots using taps of a delay line.

8. The method of claim 1 wherein a full utilization is measured as one, and no utilization is measured as zero.

9. The system of claim 1 wherein the assigning is performed by a switch configured for connecting the low and high bandwidth circuits to the application request.

10. The method of claim 1 wherein the probability is in a form of a Gaussian distribution.

* * * * *